US011092235B2

(12) United States Patent
Shimizu et al.

(10) Patent No.: US 11,092,235 B2
(45) Date of Patent: Aug. 17, 2021

(54) POWER TRANSMISSION CONTROL DEVICE

(71) Applicant: AISIN AW CO., LTD., Anjo (JP)

(72) Inventors: Yoshitaka Shimizu, Nishio (JP); Mitsutoshi Kamiya, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 237 days.

(21) Appl. No.: 16/471,763

(22) PCT Filed: Dec. 27, 2017

(86) PCT No.: PCT/JP2017/047050
§ 371 (c)(1),
(2) Date: Jun. 20, 2019

(87) PCT Pub. No.: WO2018/124219
PCT Pub. Date: Jul. 5, 2018

(65) Prior Publication Data
US 2020/0088293 A1 Mar. 19, 2020

(30) Foreign Application Priority Data
Dec. 27, 2016 (JP) .............................. JP2016-253214

(51) Int. Cl.
| *F16H 61/04* | (2006.01) |
| *F16H 61/26* | (2006.01) |
| *B60W 20/30* | (2016.01) |
| *F16H 61/00* | (2006.01) |

(Continued)

(52) U.S. Cl.
CPC ......... *F16H 61/0403* (2013.01); *F16H 61/26* (2013.01); *F16H 61/682* (2013.01);
(Continued)

(58) Field of Classification Search
CPC ................. F16H 61/0403; F16H 61/26; F16H 2061/0075; F16H 2710/04; B60W 20/30
(Continued)

(56) References Cited

U.S. PATENT DOCUMENTS 8,310,194 B2 * 11/2012 Yokai ............... H03K 17/08122
318/599
8,430,791 B2 * 4/2013 Ito .......................... B60K 6/445
477/5

(Continued)

FOREIGN PATENT DOCUMENTS

| JP | 2016-113039 A | 6/2016 |
| WO | WO 2015/068584 A1 | 5/2015 |

OTHER PUBLICATIONS

International Search Report (Form PCT/ISA/210) dated Mar. 13, 2018, by the Japanese Patent Office in corresponding International Application No. PCT/JP2017/047050. (2 pages).

(Continued)

*Primary Examiner* — Ha Dinh Ho
(74) *Attorney, Agent, or Firm* — Buchanan Ingersoll & Rooney PC

(57) ABSTRACT

An object is to reduce a delay in response. An automatic gear changing control device includes a sleeve which is moved by an actuator to perform an engagement operation, an engine which is connected to an input shaft, and a control unit which controls the movement of the sleeve by the actuator and controls the rotation of the input shaft by the engine or a motor generator. The control unit performs synchronization control of controlling the rotation of the input shaft for the engagement operation at a different gear stage after the engagement is released and starts shift control of moving the sleeve to an engagement completion position by the actuator before at least the synchronization is completed.

12 Claims, 4 Drawing Sheets

(51) Int. Cl.
*F16H 61/682* (2006.01)
*B60K 6/547* (2007.10)
(52) U.S. Cl.
CPC .............. *B60K 6/547* (2013.01); *B60W 20/30* (2013.01); *F16H 2061/0075* (2013.01); *F16H 2061/0488* (2013.01); *F16H 2306/32* (2013.01); *F16H 2306/48* (2013.01); *F16H 2710/04* (2013.01)
(58) Field of Classification Search
USPC .......................................................... 74/335
See application file for complete search history.

(56) References Cited

U.S. PATENT DOCUMENTS

| | | | |
|---|---|---|---|
| 10,439,525 B2 * | 10/2019 | Mizuo | ........................ H02P 6/20 |
| 10,525,963 B2 * | 1/2020 | Iwashita | ............... B60W 50/04 |
| 2016/0230881 A1 | 8/2016 | Koga et al. | |

OTHER PUBLICATIONS

Notification of Transmittal of Translation of the International Preliminary Report on Patentability (Form PCT/IB/338 and PCT/IB/373) dated Jul. 11, 2019 and the Written Opinion of the International Searching Authority (Form PCT/ISA/237) dated Mar. 13, 2018, by the International Bureau of WIPO in corresponding International Application No. PCT/JP2017/047050. (13 pages).
U.S. Appl. No. 16/471,597, filed Jun. 20, 2019, Manta et al.
U.S. Appl. No. 16/471,599, filed Jun. 20, 2019, Shimizu et al.
U.S. Appl. No. 16/471,800, filed Jun. 20, 2019, Inoue et al.

* cited by examiner

POWER TRANSMISSION CONTROL DEVICE

TECHNICAL FIELD

The present invention relates to a power transmission control device.

BACKGROUND ART

As an example of various automatic gear changing control devices for changing gears of a transmission, Patent Literature 1 discloses an automatic gear changing control device which controls a rotation of an input shaft for an engagement operation at another gear stage after an engagement is released. The automatic gear changing control device includes a control unit, a shift member that is moved by an actuator to perform an engagement releasing operation and an engagement operation, and a power source which is connected to an input shaft. This control unit controls the movement of the shift member by the actuator and the rotation of the input shaft by the power source.

CITATION LIST

Patent Literature

Patent Literature 1: JP 2016-113039 A

SUMMARY OF INVENTION

Technical Problem

In recent years, as described in Patent Literature 1, there are an increasing number of vehicles with automated manual transmissions (AMTS) that control a gear stage by an actuator and AMTS (non-synchronous transmissions) without a synchromesh mechanism having a synchronizer ring as a transmission have been developed. In a case of changing gears in a vehicle employing the non-synchronous transmission, a process of synchronizing a rotation speed of an idle gear with a rotation speed of a sleeve is performed at the time of switching a gear stage when the sleeve is located at a neutral position.

FIG. 4(a) is a diagram illustrating a change in rotation speed of an engine (or a rotation shaft) with time at the time of changing gears of a vehicle employing an actuator, FIG. 4(b) is a diagram illustrating a change in stroke position of a sleeve with time at that time, and FIG. 4(c) is a diagram illustrating a change in gear stage with time at that time. In FIG. 4, when a gear change request is generated at the time point of A, the actuator is controlled so that the stroke position of the sleeve is slid from a gear pressing completion position at that time point to a gear removal direction. The actuator also moves the sleeve even after the sleeve reaches an engagement start position in which an engagement is released (the time point of B) and moves the sleeve to the neutral position. Then, the actuator moves the sleeve to the next gear stage. In the case of the non-synchronous transmission, a process of synchronizing a rotation speed of the rotation shaft connected to the sleeve with a rotation speed of the idle gear at the next gear stage is performed from the time point of determining the engagement releasing operation after the time point of B. After the rotation synchronization completion (the time point of C), the sleeve starts to slide toward the idle gear at the next gear stage. At the stage in which the sleeve reaches the engagement start position so that the sleeve contacts the idle gear (the time point of D), the engagement is started. Then, the gear change is completed at the stage in which the sleeve reaches the pressing completion position through the engagement completion position.

Here, it is required that the sleeve be located at the neutral position during the rotation synchronization (between B and C) in FIG. 4. Then, the movement of the sleeve from the neutral position to the pressing completion position is started after the rotation synchronization is completed (after the time point of C). For that reason, since a period of a non-engagement state exists although an engagement state is established by the completion of the rotation synchronization, a problem arises in that this factor causes a delay in response in accordance with a shift request.

An object of the present invention is to reduce a delay in response.

Solution to Problem

A power transmission control device includes: a first rotation shaft; a power source which is connected to the first rotation shaft so that a first rotation speed corresponding to a rotation speed of the first rotation shaft is adjustable; a second rotation shaft which rotates together with an axle and is different from the first rotation shaft; a first rotation speed detection unit which detects the first rotation speed; a second rotation speed detection unit which detects a second rotation speed corresponding to a rotation speed of the second rotation shaft; a power transmission unit which includes a plurality of power transmission paths between the first rotation shaft and the second rotation shaft; and a control unit, in which the power transmission unit includes at least a first deceleration mechanism which transmits power between the first rotation shaft and the second rotation shaft, a second deceleration mechanism which transmits power between the first rotation shaft and the second rotation shaft and has a deceleration ratio different from that of the first deceleration mechanism, and a switching mechanism which changes a power transmission state between the first deceleration mechanism and the second deceleration mechanism, in which the control unit is configured to perform each of at least a switched rotation speed calculation process of calculating a switched rotation speed corresponding to the first rotation speed after the power transmission state is switched to be established by the second deceleration mechanism on the basis of the second rotation speed detected by the second rotation speed detection unit when the power transmission state established by the first deceleration mechanism is switched to the power transmission state established by the second deceleration mechanism, a synchronization control process of controlling the rotation speed of the first rotation shaft by the power source so that the first rotation speed is synchronized with the switched rotation speed calculated by the switched rotation speed calculation process after the power transmission state by the first deceleration mechanism is released, and a switching control process of controlling the switching mechanism so that the power transmission state by the second deceleration mechanism is established after the first rotation speed is completely synchronized with the switched rotation speed calculated by the switched rotation speed calculation process in the synchronization control process, and in which in the switching control process, the control of the switching mechanism is started to establish the power transmission state by the second deceleration mechanism before the first rotation speed is completely synchronized with the switched rotation speed calculated by the switched rotation speed calculation process.

According to the above-described configuration, it is possible to reduce a delay in response and to shorten a time necessary for changing gears.

The switching mechanism may include an engagement member that is provided to be rotatable along with any one of the first rotation shaft and the second rotation shaft and to be movable in the axial direction of the one shaft and is disposed between the first deceleration mechanism and the second deceleration mechanism and an actuator which is operated to move the engagement member in the axial direction, the first deceleration mechanism may be configured to establish the power transmission state by engaging with the engagement member when the engagement member moves toward the first deceleration mechanism in the axial direction, the second deceleration mechanism may be configured to establish the power transmission state by engaging with the engagement member when the engagement member moves toward the second deceleration mechanism in the axial direction, the actuator may include an operation amount detection unit which detects an operation amount of the actuator, the control unit may be configured to perform each of a differential rotation calculation process of calculating a differential rotation change rate corresponding to a change amount per unit time of a differential rotation and the differential rotation corresponding to a rotation speed difference between the switched rotation speed and the first rotation speed and a required operation amount calculation process of calculating a required operation amount corresponding to an operation amount of the actuator necessary until the engagement member starts to engage with the second deceleration mechanism, and in the switching control process, an operation speed of the actuator may be determined on the basis of the differential rotation and the differential rotation change rate calculated by the differential rotation calculation process and the required operation amount calculated by the required operation amount calculation process.

A positional relationship between the engagement member and the second deceleration mechanism in the axial direction may include at least an engagement completion position corresponding to a position in which a state that the power transmission is not established and a state that the power transmission is established are switched between the engagement member and the second deceleration mechanism is established or not, a neutral position corresponding to a position in which both of the power transmission state between the engagement member and the first deceleration mechanism and the power transmission state between the engagement member and the second deceleration mechanism are not established, an engagement start position corresponding to a position which is located between the engagement completion position and the neutral position and in which the power transmission state between the engagement member and the second deceleration mechanism is not established, but the engagement member and the second deceleration mechanism start to contact each other, and a position immediately before engagement start corresponding to a position which is located between the neutral position and the engagement start position, and the required operation amount may be an operation amount of the actuator necessary until the actuator reaches the position immediately before engagement start.

The position immediately before engagement start may be a position separated from the engagement start position by a predetermined distance.

In the synchronization control process, the first rotation speed may be controlled by the power source so that the differential rotation change rate calculated by the differential rotation calculation process becomes a predetermined change rate.

The control unit may be configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and in the switching control process, the control of the switching mechanism may be started to establish the power transmission state by the second deceleration mechanism before the first rotation speed is completely synchronized with the switched rotation speed calculated by the switched rotation speed calculation process after the actuator is operated by the predetermined operation amount.

Advantageous Effects of Invention

Due to the above-described configuration, since a delay in response is reduced and a time required for changing gears is shortened, driving performance is improved.

DESCRIPTION OF EMBODIMENTS

Figure 1:
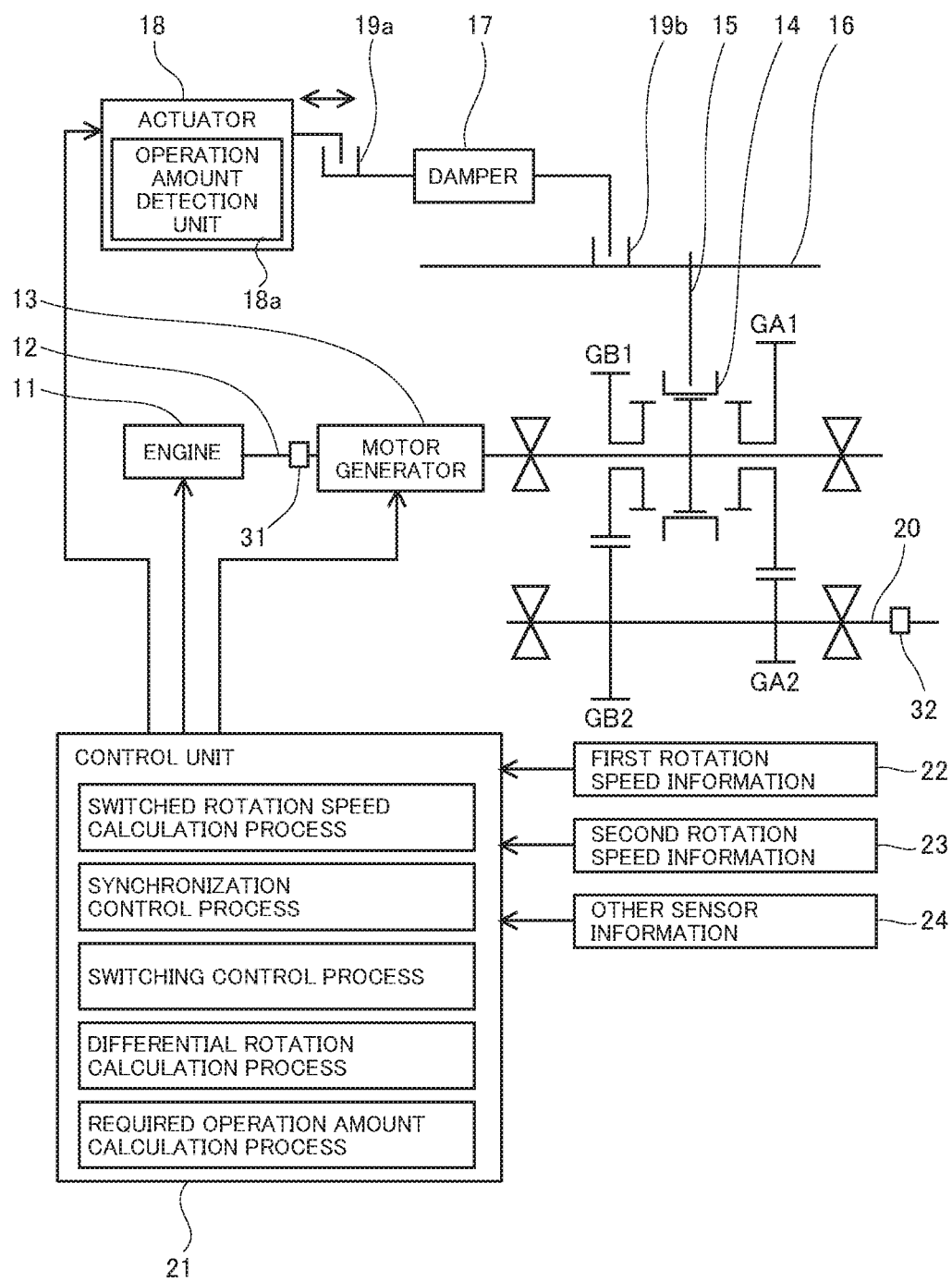
FIG. 1 is an explanatory diagram illustrating a configuration of a vehicle involving with a power transmission control device of the present invention.

Hereinafter, an example of a power transmission control device 10 according to an embodiment will be described with reference to the drawings. FIG. 1 is an explanatory diagram illustrating a configuration of a vehicle involving with a power transmission control device of the present invention. In FIG. 1, 11 denotes an engine which is a power source, 12 denotes an input shaft which is a first rotation shaft, 13 denotes a motor generator which is another power source, 14 denotes a sleeve which is supported by the input shaft 12 as an engagement member to be movable and rotatable together in the axial direction, 15 denotes a shift fork, 16 denotes a shift shaft, 17 denotes a damper, 18 denotes an actuator, 19a and 19b denote power transmission mechanisms, 20 denotes an output shaft which is a second rotation shaft, 21 denotes a control unit, 31 denotes a first rotation speed detection unit which detects a first rotation speed corresponding to the rotation speed of the input shaft 12, and 32 denotes a second rotation speed detection unit which detects a second rotation speed corresponding to the rotation speed of the output shaft 20. An idle gear GA1 and an idle gear GB1 which are target engagement members are connected to the input shaft 12 to be relatively rotatable and a gear GA2 and a gear GB2 are connected to the output shaft 20 to be rotatable together. The idle gear GA1 and the gear GA2 constitute a first deceleration mechanism 51 and the idle gear GB1 and the gear GB2 constitute a second deceleration mechanism 52.

Furthermore, in the description below, a power transmission unit in which only a pair of the idle gear GA1 and the gear GA2 and a pair of the idle gear GB1 and the gear GB2 are used for changing gears, one sleeve 14 is disposed between the idle gear GA1 and the idle gear GB1, and a gear is changed by using the one sleeve 14 will be described in order to simply the description. However, it is assumed that more gears are provided to be changed in an actual power transmission unit. Further, it is assumed, of course, that the output shaft 20 is provided with the idle gears GA1 and GB1 which are relatively rotatable and the sleeve 14 which is rotatable together and movable in the axial direction and the input shaft 12 is provided with the gears GA2 and GB2 which are rotatable together. Furthermore, for convenience of description, it is mentioned that the idle gear GA1 and the gear GA2 constitute the first deceleration mechanism 51 and the idle gear GB1 and the gear GB2 constitute the second deceleration mechanism 52. However, the idle gear GB1 and the gear GB2 may constitute the first deceleration mechanism 51 and the idle gear GA1 and the gear GA1 may constitute the second deceleration mechanism 52. Further, it is assumed that the power transmission unit may be configured by using three axes or more, for example, as in the input shaft, the counter shaft, and the output shaft. Further, power transmission mechanisms 19a and 19b are interposed in order to transmit the power of the actuator 18 to the shift shaft 16, but the present invention is not limited to this configuration. For example, any configuration may be employed as long as the operation of the sleeve 14 can be controlled by the power of the actuator 18. Further, it is not an essential problem whether to employ a synchronization mechanism of the present invention since the synchronization mechanism can be employed in any case. However, in this example, a description will be made by using a non-synchronous transmission without a synchronization mechanism. Further, in a configuration that changes gears by the actuator 18, gears may be changed by a gear change request based on a driver's operation or gears may be automatically changed when a predetermined gear change condition is satisfied.

In FIG. 1, the engine 11 rotationally drives the input shaft 12. Furthermore, although it is not an essential configuration, a motor generator 13 capable of rotationally driving the input shaft 12 may be disposed. Further, a clutch or a torque converter may be disposed between the engine 11 and the motor generator 13. The idle gear GA1 and the idle gear GB1 are connected to the input shaft 12 to be relatively rotatable and the sleeve 14 is located therebetween without engaging with any one of the gears in a neutral state. The position of the sleeve 14 at this time is a neutral position. When a gear is changed to any gear stage, for example, the gear stage of the idle gear GA1, the idle gear GA1 and the input shaft 12 are fixed so as not to be relatively rotatable by the switching mechanism. That is, when the sleeve 14 moves toward the first deceleration mechanism 51 in the axial direction, the sleeve 14 completely engages with the idle gear GA1 so that a power transmission state is established. Meanwhile, when the sleeve 14 moves toward the second deceleration mechanism 52 in the axial direction, the sleeve 14 completely engages with the idle gear GB1 so that a power transmission state is established.

In FIG. 1, the switching mechanism includes the shift fork 15, the shift shaft 16, the damper 17, the actuator 18, the power transmission mechanism 19a, and the power transmission mechanism 19b. In the switching mechanism, power generated from the actuator 18 is transmitted to the shift shaft 16 through the power transmission mechanism 19a, the damper 17, and the power transmission mechanism 19b so that the sleeve 14 is operated. The actuator 18 includes, for example, a motor (not illustrated), a converting mechanism which converts a torque of a motor into a thrust, and an operation amount detection unit 18a which is a sensor for monitoring the operation amount of the converting mechanism. The actuator 18 receives information output from the control unit 21 and controls the output of the motor and the operation amount of the sleeve 14 in the axial direction. As a result, the stroke amount (the movement amount) of the sleeve 14 in the axial direction is controlled with high accuracy.

Further, the control unit 21 has a function of performing various processes used to change gears in the non-synchronous transmission. The control unit 21 of this example has at least a function of performing a switched rotation speed calculation process, a synchronization control process, a switching control process, a differential rotation calculation process, and a required operation amount calculation process.

In the switched rotation speed calculation process, a process of calculating a first rotation speed at the time of switching the power transmission state by the switching mechanism is performed. In this example, the control unit 21 calculates the switched rotation speed corresponding to the first rotation speed after the power transmission state is switched to be established by the second deceleration mechanism 52 on the basis of the second rotation speed detected by the second rotation speed detection unit 32 when the power transmission state established by the first deceleration mechanism 51 is switched to the power transmission state established by the second deceleration mechanism 52.

In the synchronization control process, a process of controlling the output of the engine 11 on the basis of the switched rotation speed calculated by the switched rotation speed calculation process is performed. In this example, the control unit 21 controls the engine 11 so that the first rotation speed is synchronized with the switched rotation speed calculated by the switched rotation speed calculation process after the power transmission state by the first deceleration mechanism 51 is released.

In the switching control process, a process of outputting information for operating the switching mechanism to the switching mechanism is performed. In this example, the control unit 21 controls the operation of the switching mechanism so that the power transmission state is established by the second deceleration mechanism 52 after the first rotation speed is completely synchronized with the switched rotation speed and starts the control of the switching mechanism to establish the power transmission state by the second deceleration mechanism 52 before the synchronization is completed.

In the differential rotation calculation process, a process of calculating how the rotation speed difference changes until the power transmission state is switched by the switching mechanism is performed. In this example, the control unit 21 performs a process of calculating a differential rotation change rate which is a change amount per unit time of a differential rotation corresponding to a difference between a first rotation speed at a time point detected by the first rotation speed detection unit 31 and the switched rotation speed.

In the required operation amount calculation process, a process of calculating the operation amount of the actuator 18 is performed. In this example, the control unit 21 calculates a required operation amount which is the operation amount of the actuator 18 from a position detected by the operation amount detection unit 18*a* to a position immediately before the sleeve 14 starts to engage with the second deceleration mechanism 52. Furthermore, an example of a configuration of calculating the required operation amount is not limited thereto. For example, the required operation amount may be the operation amount of the actuator 18 while the sleeve 14 engages with the second deceleration mechanism 52.

In the required operation amount calculation process, a process of calculating the operation amount of the actuator 18 is performed. In this example, the control unit 21 calculates the required operation amount which is the operation amount of the actuator 18 immediately before the sleeve 14 starts to engage with the idle gear GB1.

Further, the first rotation speed information 22 for the first rotation speed detected by the first rotation speed detection unit 31, the second rotation speed information 23 for the second rotation speed detected by the second rotation speed detection unit 32, and the other sensor information 24 are input to the control unit 21. The other sensor information 24 includes vehicle speed information, accelerator opening degree information, and accelerator opening degree change rate information corresponding to a change amount of an accelerator opening degree per unit time.

Terms to be used in the following description are defined as below.

(Engagement Release State)

An engagement release state means a state in which the engagement member does not contact the target engagement member and does not transmit power. That is, in this example, this state means a state in which the spline of the sleeve does not contact the spline of the idle gear and a neutral state when an idle gear exists at both sides.

(Engagement Start State)

An engagement start state means a state in which the engagement member contacts the target engagement member, but does not transmit power. Specifically, this state means a state in which a reaction force is generated so that the sleeve is separated from the gear piece at the time of transmitting power while chamfered portions or round portions contact each other when the spline tips of the sleeve and the idle gear have a chamfered shape or a round shape. Further, there is also a case in which tips contact each other when the spline tip is plane.

(Engagement Completion State)

An engagement completion state means a state in which the engagement member contacts the target engagement member and transmits power. In this example, this state means a state in which the spline of the sleeve is pressed into a spline gap of the idle gear so that power is transmitted in a complete engagement state. This case does not include only a case in which the chamfered portions, the round portions, and the spline tips contact each other.

(Pressing Completion State)

A pressing completion state means a state in which the engagement member is moved to switch the engagement start state to the engagement completion state and the engagement member is further moved so that the engagement member reaches a boundary of the movement range. This state is a part of the engagement completion state. Specifically, this state means a state in which the actuator is continuously operated so as to further move the engagement member from the engagement completion state and is controlled to abut on a stopper corresponding to the boundary of the movement range of the actuator. For example, this state means a state in which the actuator is operated to press the stopper at a constant load. This state means an image in which the sleeve further moves inward from the engagement completion state.

(Position Immediately Before Engagement Start)

A position immediately before engagement start means a position between the neutral position and the engagement start position in the axial direction of the sleeve 14 in an operation state and is located within a neutral range while being separated from the engagement start position by a predetermined distance.

(Engagement Start Position)

An engagement start position means a boundary position on whether the engagement member contacts the target engagement member or not and a position in which the engagement release state and the engagement start state are switched. That is, this position means a position in which the engagement member starts to contact the target engagement member at the time of engaging the engagement member with the target engagement member and a position in which the engagement member does not contact the target engagement member at the time of releasing the engagement between the engagement member and the target engagement member. Furthermore, the engagement start position may be a position separated by a predetermined distance from a boundary position on whether the engagement member contacts the target engagement member or not in consideration of the operation amount detection accuracy or the like of the actuator.

(Engagement Completion Position)

An engagement completion position means a position in which the engagement member contacts the target engagement member and a position in which the engagement start state and the engagement completion state are switched. Furthermore, the engagement completion position may be a position separated by a predetermined distance from a position of switching the engagement start state and the engagement completion state in consideration of the operation amount detection accuracy or the like of the actuator.

(Pressing Completion Position)

A pressing completion position means a position in which the engagement member contacts the target engagement member and a position in the pressing completion state.

Figure 2:
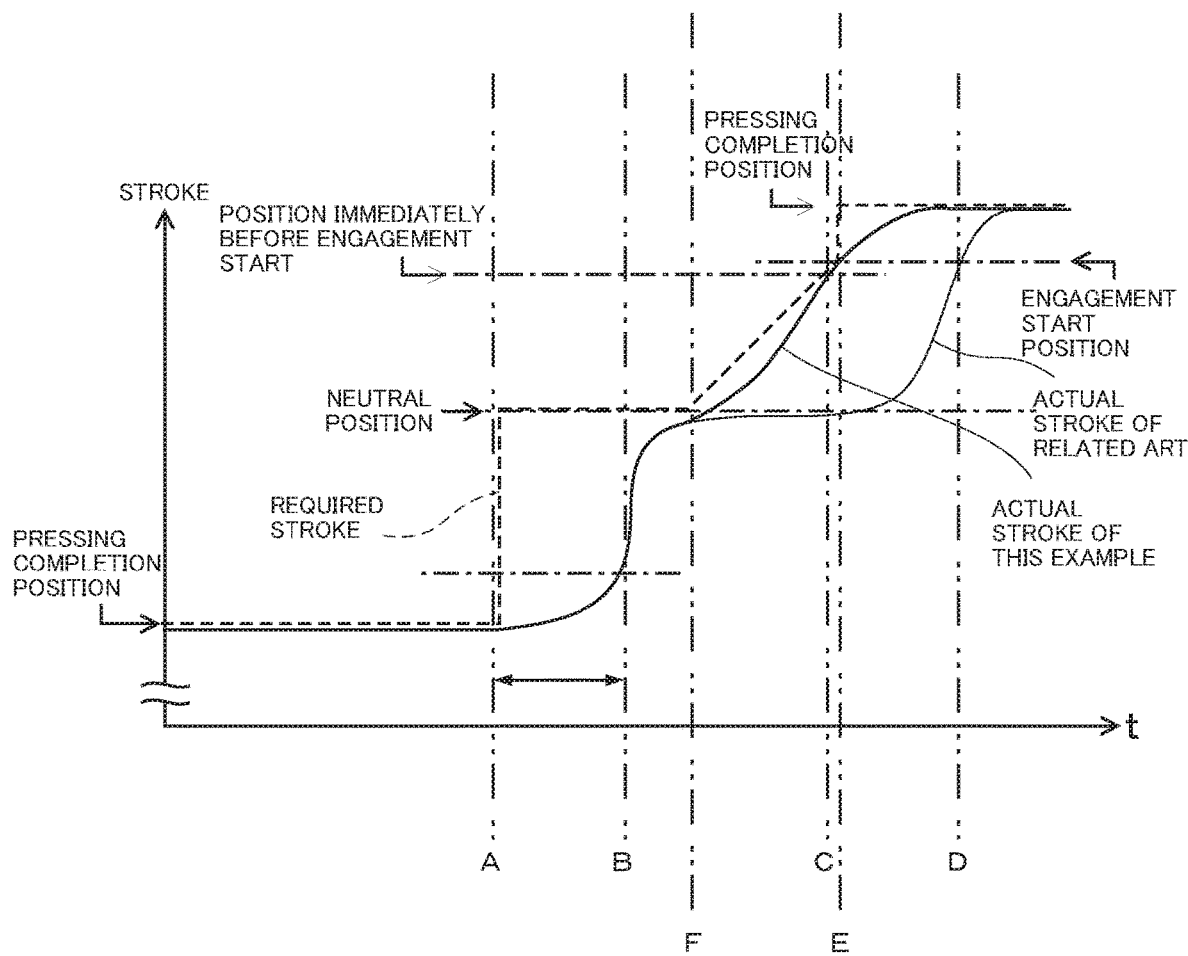
FIG. 2 is an explanatory diagram for illustrating a concept of engagement operation control of the present invention and is an explanatory diagram illustrating a stroke amount of a sleeve during an engagement operation.

FIG. 2 is an explanatory diagram for illustrating a concept of engagement operation control of the present invention and is an explanatory diagram illustrating a stroke amount of the sleeve 14. In FIG. 2, a horizontal axis indicates a time and a vertical axis indicates the stroke amount of the sleeve 14 detected by a sensor inside the actuator 18. Then, the stroke of the sleeve 14 is shown until the sleeve 14 engaging with the idle gear GA1 enters the idle gear GB1. In the power transmission control device 10 of this example, a shift control start position (a start point of F) is defined as a position for starting the shift control. For that reason, a locus of a stroke different from the related art is depicted from a position passing through the shift control start position. Furthermore, the shift control means control that moves the sleeve 14 to the engagement completion position by the actuator 18 to engage with the gear.

In the related art, the stroke amount is controlled so that the sleeve 14 stays at the neutral position until the synchronization of the rotation speed is completed (the time point of C) after passing through the shift control start position (after passing through the start point of F). Meanwhile, in this example, since the synchronization control is performed and the shift control is started at least before the synchronization is completed by the synchronization control, the stroke amount is controlled so as to be located at the position immediately before engagement start at the time point (the time point of C) in which the synchronization of the rotation speed is completed.

Figure 3:
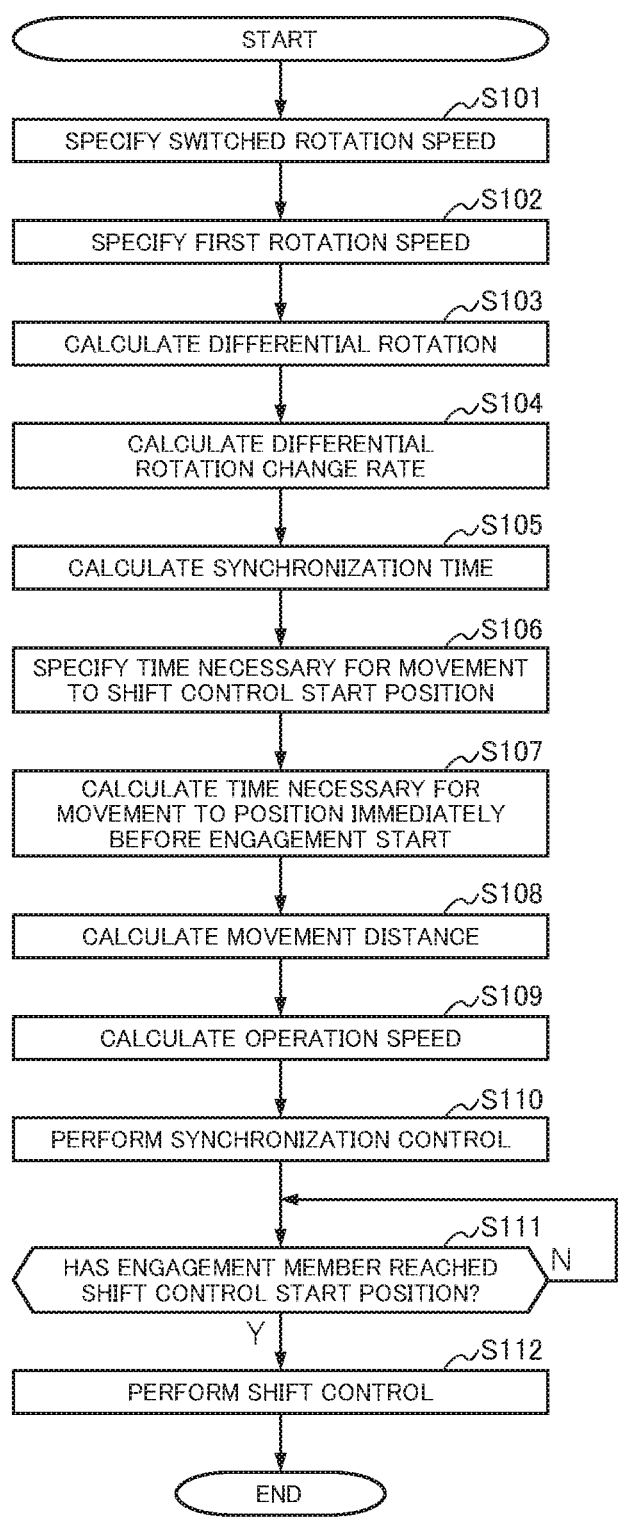
FIG. 3 is a flowchart illustrating a flow of engagement operation control of the present invention.
Figure 4A:
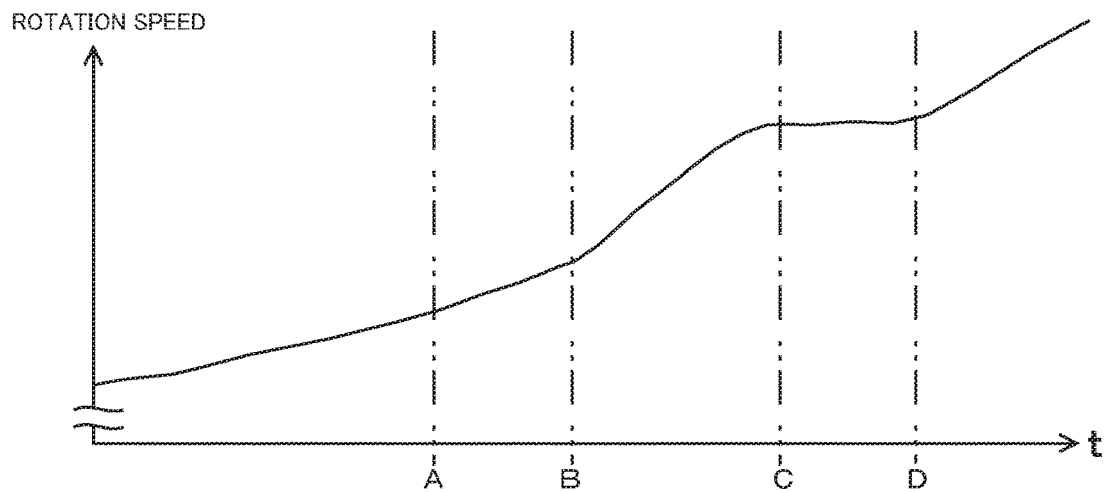
FIG. 4(a) is a diagram illustrating a change in rotation speed of an engine (or a rotation shaft) with time at the time of changing gears of a vehicle employing an actuator.
Figure 4B:
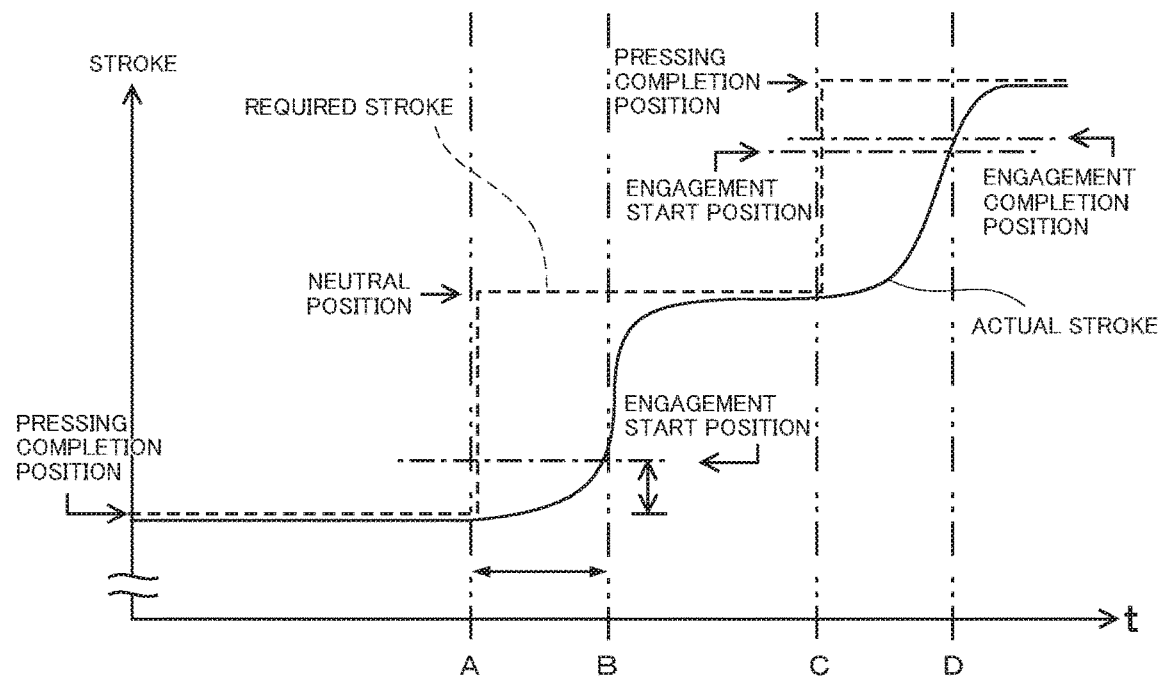
FIG. 4(b) is a diagram illustrating a change in stroke position of a sleeve with time at that time.
Figure 4C:
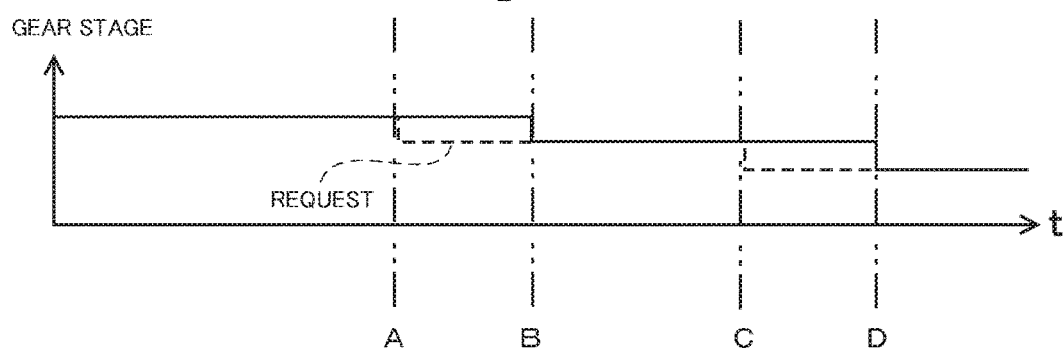
FIG. 4(c) is a diagram illustrating a change in gear stage with time at that time.

FIG. 3 is a flowchart illustrating a flow of an engagement operation process of the present invention. In this flow, an example of a process in which the sleeve 14 which is in the engagement completion state with the idle gear GA1 moves to the engagement start position of the idle gear GA1 to become the engagement release state after receiving a shift request when the vehicle travels will be described. That is, an example of a process after the engagement release state will be described.

When the shift request is received in the engagement operation process, the control unit 21 first specifies the first rotation speed at a time point in which the idle gear GB1 and the sleeve 14 are in the engagement start state as a switched rotation speed (step S101). In this example, the control unit 21 acquires the second rotation speed information 23 for the second rotation speed detected by the second rotation speed detection unit 32 provided in the output shaft 20 and calculates the first rotation speed corresponding to the second rotation speed as the switched rotation speed.

Next, the control unit 21 specifies the first rotation speed at an engagement release time point (step S102). For example, the control unit 21 acquires the first rotation speed information 22 for the current first rotation speed detected by the first rotation speed detection unit 31. Furthermore, the information specified herein may be information in which the rotation speed of the sleeve 14 engaging with the idle gear GB1 can be recognized. That is, the information received by the control unit 21 may be information for the output of the engine 11 or the information for the rotation speed of the sleeve 14.

Next, the control unit 21 calculates the differential rotation on the basis of the switched rotation speed and the first rotation speed at the engagement release time point.

When the differential rotation is calculated, the control unit 21 calculates the differential rotation change rate until the differential rotation becomes the target rotation difference (step S104). Further, the "target rotation difference" may be zero, but may be preferably a minute value. That is, it is preferable that the sleeve 14 and the idle gear GB1 are in the engagement start state while a slight differential rotation exists. Since the sleeve 14 and the idle gear GB1 are in the engagement start state while a slight differential rotation exists, a smooth engagement can be realized. Furthermore, for convenience of description, a state in which the differential rotation reaches the target rotation difference is expressed that the first rotation speed reaches the switched rotation speed. The differential rotation change rate becomes a positive value (that is, a change rate for increasing the rotation speed) at the time of performing the synchronization control for down-shifting. Meanwhile, the differential rotation change rate becomes a negative value (that is, a change rate for decreasing the rotation speed) at the time of performing the synchronization control for up-shifting.

Furthermore, as an example of the above-described calculation, a calculation may be performed so that the differential rotation change rate is constant or substantially constant. Further, as another example, the differential rotation change rate may be changed in response to the rotation difference by setting a constant synchronization control time. Further, as still another example, the differential rotation change rate capable of obtaining an efficient engine output may be calculated by referring to the information for the torque of the engine 11.

Next, the control unit 21 performs a process of performing the shift control. First, the control unit 21 calculates a time necessary until the first rotation speed reaches the switched rotation speed from the differential rotation change rate as a synchronization time (step S105). That is, a time until the differential rotation becomes the target rotation difference is calculated.

When the synchronization time is calculated, the control unit 21 specifies a time necessary for the movement of the idle gear GA1 from the engagement start position to the neutral position or the shift control start position corresponding to the near position (step S106). That is, the control unit 21 specifies a time necessary for the movement from B to F in FIG. 2. Since the actual stroke from B to F in FIG. 2 is constant, for example, the control unit 21 can specify a time necessary for the movement of the idle gear GA1 from the engagement start position to the shift control start position by referring to information for the actual stroke from B to F in FIG. 2.

When a time necessary for the movement of the idle gear GA1 from the engagement start position to the shift control start position is specified, the control unit 21 calculates a difference between a synchronization time and a time necessary for the movement of the idle gear GA1 from the engagement start position to the shift control start position (step S107). That is, the control unit 21 calculates a movement time from the shift control start position to the position immediately before engagement start of the idle gear GB1.

Next, the control unit 21 calculates a movement distances from the shift control start position to the position immediately before engagement start of the idle gear GB1 (step S108). In other words, the control unit 21 specifies the required operation amount of the sleeve 14 based on the actuator 18 when moving the sleeve 14 from the shift control start position to the position immediately before engagement start of the idle gear GB1.

On the basis of the calculated movement time and distance, the control unit 21 calculates the operation speed of the sleeve 14 (step S109). For example, the control unit 21 calculates the operation speed so that the sleeve 14 is located at the position immediately before engagement start of the idle gear GB1 when the rotation difference becomes the target rotation difference. Furthermore, the operation speed from the position immediately before engagement start of the idle gear GB1 to the engagement completion position during the shift control may be appropriately calculated by referring to the operation speed to the position immediately before engagement start.

Next, the control unit 21 performs the synchronization control (step S110). Specifically, the control unit 21 generates instruction information for changing the first rotation speed on the basis of the differential rotation change rate calculated in step S104 and transmits the instruction information to the engine 11. The engine 11 which receives the instruction information changes the rotation speed of the engine 11 on the basis of the received instruction information. That is, the synchronization control for synchronizing the rotation speed of the input shaft 12 with the rotation speed of the output shaft 20 is performed by changing the rotation speed of the engine 11. Furthermore, in this example, the synchronization control is performed for the engagement operation with the other transmission by the control of the engine 11, but the synchronization control may be realized by the control of the motor generator 13.

When the synchronization control is performed, the control unit 21 determines whether the engagement member reaches the shift control start position (step S111). When the control unit 21 determines that the engagement member does not reach that position (N of step S111), the routine proceeds to step S111 to determine whether the engagement member reaches the shift control start position again.

Meanwhile, when the control unit 21 determines that the engagement member reaches that position (Y of step S111), the shift control is performed (step S112). Specifically, the control unit 21 generates instruction information for operating the sleeve 14 on the basis of the operation speed calculated in step S109 and transmits the instruction information to the actuator 18. The actuator 18 which receives the instruction information operates the sleeve 14 on the basis of the received instruction information. That is, the shift control for moving the sleeve 14 to the engagement completion position of the idle gear GB1 to perform the engagement operation is performed by controlling the operation of the sleeve 14 using the actuator 18. In addition, after the sleeve 14 reaches the engagement completion position of the idle gear GB1, the sleeve moves further to the pressing completion position of the idle gear GB1.

Furthermore, the control unit 21 is configured to determine whether the engagement member reaches the shift control start position, but the present invention is not limited to such a configuration. For example, the control unit 21 may be configured to operate the actuator 18 by a predetermined operation amount so that the sleeve 14 is released from the idle gear GA1 and is moved to the idle gear GB1 in the neutral state. Then, the control unit 21 may be configured to perform the shift control after operating the actuator 18 by the predetermined operation amount.

When the synchronization control and the shift control are completed, the control unit 21 ends a process herein. As described above, since the control unit 21 performs the synchronization control and the shift control, it is possible to switch to the engagement completion state through the engagement start state and to finally switch to the pressing completion state when the gears are changed in the vehicle employing the non-synchronous transmission.

Furthermore, a timing of starting the shift control may be set to a timing at least before the synchronization is completed. In this case, since the operation speed calculation method is adjusted along with the adjustment of the timing of performing the shift control, the stroke amount is controlled to be located at the position immediately before engagement start at a time point in which the synchronization of the rotation speed is completed. Here, the "completion of the synchronization" means a state in which the first rotation speed becomes the rotation speed at which the engagement release state is switched to the engagement start state and means a state in which the first rotation speed reaches the switched rotation speed.

Further, an example of a process at a time point in which the sleeve 14 and the idle gear GA1 are in the engagement release state has been described, but the process of this example can be employed other than the engagement release time point. For example, the power transmission control device 10 can determine the operation speed of the sleeve 14 based on the actuator 18 so that the sleeve 14 reaches the position immediately before engagement start at a timing in which the synchronization is completed on the basis of the distance to the position immediately before engagement start of the sleeve 14, the differential rotation change rate, and the difference between the target rotation difference and the differential rotation at the time point of starting the shift control during the shift control. Further, the power transmission control device 10 may adjust the operation speed of the sleeve 14 based on the actuator 18 so that the sleeve 14 reaches the position immediately before engagement start at a timing in which the synchronization is completed on the basis of the distance to the position immediately before engagement start of the sleeve 14, the differential rotation change rate, and the difference between the differential rotation and the target rotation difference whenever a predetermined time elapses during the shift control.

Further, a description has been made so that the control unit 21 performs a series of processes in the flowchart, but the present invention is not limited to such a configuration. For example, the control unit 21 may separately perform a process of performing the synchronization control and a process of performing the shift control and may perform the synchronization control and the shift control in synchronization.

As described above, the power transmission control device 10 according to the present invention includes the sleeve 14 which is moved by the actuator 18 to perform an engagement releasing operation and an engagement operation, the motor generator 13 which is connected to the input shaft 12 or the engine 11 which is connected to the input shaft 12, and the control unit 21 which controls the movement of the sleeve 14 by the actuator 18 and controls the rotation of the input shaft 12 by the engine 11 or the motor generator 13 and the control unit 21 performs the synchronization control of synchronizing the rotation of the input shaft 12 by the engine 11 or the motor generator 13 for the engagement operation at another gear stage after an engagement is released and starts the shift control of moving the sleeve 14 to the engagement completion position by the actuator 18 at least before the synchronization is completed. According to such a configuration, since a delay in response is reduced and a time necessary for changing gears is shortened, driving performance is improved.

Further, as described in the above-described embodiment, the power transmission control device 10 is configured to start the shift control at a position moved from an engagement releasing position by a predetermined distance. According to such a configuration, the operation performance is improved since an operation feeling close to the required stroke can be obtained.

Furthermore, although there is no particular mention in the above-described embodiment, the control unit 21 may be configured to perform the synchronization control and the shift control again in accordance with the information detection state at that time point when a predetermined interval or a predetermined condition is satisfied during the synchronization control and the shift control. According to such a configuration, it is possible to sequentially realize an engagement operation with high accuracy in accordance with a changing situation.

In the above-described embodiment, a configuration in which the sleeve 14 engages with the idle gears GA1 and GB1 is employed, but the present invention is not limited to such a configuration. For example, one pulley for transmitting power by a belt or one sprocket for transmitting power by a chain may be rotated with respect to the shaft and a dog clutch may be engaged with or disengaged from the shaft.

REFERENCE SIGNS LIST

10 Power transmission control device
11 Engine (power source)
12 Input shaft (first rotation shaft)
13 Motor generator
14 Sleeve
15 Shift fork 16 Shift shaft
17 Damper
18 Actuator
18a Operation amount detection unit
19a, 19b Power transmission mechanism
20 Output shaft (second rotation shaft)
21 Control unit
22 First rotation speed information
23 Second rotation speed information
24 Other sensor information
31 First rotation speed detection unit
32 Second rotation speed detection unit
51 First deceleration mechanism
52 Second deceleration mechanism

The invention claimed is:

1. A power transmission control device comprising:
a first rotation shaft;
a power source which is connected to the first rotation shaft so that a first rotation speed corresponding to a rotation speed of the first rotation shaft is adjustable;
a second rotation shaft which rotates together with an axle and is different from the first rotation shaft;
a first rotation speed detection unit which detects the first rotation speed;
a second rotation speed detection unit which detects a second rotation speed corresponding to a rotation speed of the second rotation shaft;
a power transmission unit which includes a plurality of power transmission paths between the first rotation shaft and the second rotation shaft; and
a control unit,
wherein the power transmission unit includes at least:
a first deceleration mechanism which transmits power between the first rotation shaft and the second rotation shaft;
a second deceleration mechanism which transmits power between the first rotation shaft and the second rotation shaft and has a deceleration ratio different from that of the first deceleration mechanism; and
a switching mechanism which changes a power transmission state between the first deceleration mechanism and the second deceleration mechanism,
wherein the control unit is configured to perform each of at least
a switched rotation speed calculation process of calculating a switched rotation speed corresponding to the first rotation speed after the power transmission state is switched to be established by the second deceleration mechanism on the basis of the second rotation speed detected by the second rotation speed detection unit when the power transmission state established by the first deceleration mechanism is switched to the power transmission state established by the second deceleration mechanism,
a synchronization control process of controlling the rotation speed of the first rotation shaft by the power source so that the first rotation speed is synchronized with the switched rotation speed calculated by the switched rotation speed calculation process after the power transmission state by the first deceleration mechanism is released, and
a switching control process of controlling the switching mechanism so that the power transmission state by the second deceleration mechanism is established after the first rotation speed is completely synchronized with the switched rotation speed calculated by the switched rotation speed calculation process in the synchronization control process,
wherein in the switching control process, the control of the switching mechanism is started to establish the power transmission state by the second deceleration mechanism before the first rotation speed is completely synchronized with the switched rotation speed calculated by the switched rotation speed calculation process,
wherein the switching mechanism includes:
an engagement member that is provided to be rotatable along with any one of the first rotation shaft and the second rotation shaft and to be movable in the axial direction of the one shaft and is disposed between the first deceleration mechanism and the second deceleration mechanism; and
an actuator which is operated to move the engagement member in the axial direction,
wherein the first deceleration mechanism is configured to establish the power transmission state by engaging with the engagement member when the engagement member moves toward the first deceleration mechanism in the axial direction,
wherein the second deceleration mechanism is configured to establish the power transmission state by engaging with the engagement member when the engagement member moves toward the second deceleration mechanism in the axial direction,
wherein the actuator includes an operation amount detection unit which detects an operation amount of the actuator,
wherein the control unit is configured to perform each of
a differential rotation calculation process of calculating a differential rotation change rate corresponding to a change amount per unit time of a differential rotation and the differential rotation corresponding to a rotation speed difference between the switched rotation speed and the first rotation speed, and
a required operation amount calculation process of calculating a required operation amount corresponding to an operation amount of the actuator necessary until the engagement member starts to engage with the second deceleration mechanism, and
wherein in the switching control process, an operation speed of the actuator is determined on the basis of the differential rotation and the differential rotation change rate calculated by the differential rotation calculation process and the required operation amount calculated by the required operation amount calculation process.

2. The power transmission control device according to claim 1,
wherein a positional relationship between the engagement member and the second deceleration mechanism in the axial direction includes at least:
an engagement completion position corresponding to a position in which a state that the power transmission is not established and a state that the power transmission is established are switched between the engagement member and the second deceleration mechanism;
a neutral position corresponding to a position in which both of the power transmission state between the engagement member and the first deceleration mechanism and the power transmission state between the engagement member and the second deceleration mechanism are not established;

an engagement start position corresponding to a position which is located between the engagement completion position and the neutral position and in which the power transmission state between the engagement member and the second deceleration mechanism is not established, but the engagement member and the second deceleration mechanism start to contact each other; and a position immediately before engagement start corresponding to a position which is located between the neutral position and the engagement start position, and wherein the required operation amount is an operation amount of the actuator necessary until the actuator reaches the position immediately before engagement start.

3. The power transmission control device according to claim 2,
wherein the position immediately before engagement start is a position separated from the engagement start position by a predetermined distance.

4. The power transmission control device according to claim 3,
wherein in the synchronization control process, the first rotation speed is controlled by the power source so that the differential rotation change rate calculated by the differential rotation calculation process becomes a predetermined change rate.

5. The power transmission control device according to claim 4,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and
wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

6. The power transmission control device according to claim 3,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and
wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

7. The power transmission control device according to claim 2,
wherein in the synchronization control process, the first rotation speed is controlled by the power source so that the differential rotation change rate calculated by the differential rotation calculation process becomes a predetermined change rate.

8. The power transmission control device according to claim 7,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and
wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

9. The power transmission control device according to claim 2,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and
wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

10. The power transmission control device according to claim 1,
wherein in the synchronization control process, the first rotation speed is controlled by the power source so that the differential rotation change rate calculated by the differential rotation calculation process becomes a predetermined change rate.

11. The power transmission control device according to claim 10,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and
wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

12. The power transmission control device according to claim 1,
wherein the control unit is configured to perform a process of operating the actuator by a predetermined operation amount so that the engagement member moves to the second deceleration mechanism while maintaining a state in which the power transmission state by the second deceleration mechanism is not established after releasing the power transmission state by the first deceleration mechanism, and wherein in the switching control process, the control of the switching mechanism is started to establish the power transmission state by the second deceleration mechanism before the first rotation speed is completely synchronized with the switched rotation speed calculated by the switched rotation speed calculation process after the actuator is operated by the predetermined operation amount.

\* \* \* \* \*